(12) United States Patent
Malik et al.

(10) Patent No.: US 11,897,602 B2
(45) Date of Patent: Feb. 13, 2024

(54) SUPPORT STRUCTURE FOR AN AIRCRAFT LANDING GEAR

(71) Applicant: The Boeing Company, Chicago, IL (US)

(72) Inventors: Muhammad Mustajab Malik, Mukilteo, WA (US); Waeil M. Ashmawi, Bellevue, WA (US)

(73) Assignee: THE BOEING COMPANY, Arlington, VA (US)

( * ) Notice: Subject to any disclaimer, the term of this patent is extended or adjusted under 35 U.S.C. 154(b) by 9 days.

(21) Appl. No.: 17/689,169

(22) Filed: Mar. 8, 2022

(65) Prior Publication Data

US 2022/0297824 A1    Sep. 22, 2022

Related U.S. Application Data

(60) Provisional application No. 63/162,225, filed on Mar. 17, 2021.

(51) Int. Cl.
*B64C 25/04* (2006.01)
*B64C 3/18* (2006.01)

(52) U.S. Cl.
CPC .............. *B64C 25/04* (2013.01); *B64C 3/185* (2013.01); *B64C 3/187* (2013.01)

(58) Field of Classification Search
CPC .......... B64C 25/04; B64C 3/185; B64C 3/187
See application file for complete search history.

(56) References Cited

U.S. PATENT DOCUMENTS

| 3,687,400 | A  | * | 8/1972 | Fitzgerald | ............... B64C 25/34 |
| | | | | | 244/102 R |
| 6,679,452 | B1 | * | 1/2004 | Cottet | ..................... B64C 25/04 |
| | | | | | 244/102 R |
| 8,523,107 | B2 | | 9/2013 | Salmon et al. | |
| 8,899,520 | B2 | | 12/2014 | Barmichev et al. | |
| 9,180,956 | B1 | | 11/2015 | Thomas et al. | |
| 9,440,732 | B2 | | 9/2016 | Toon | |
| 10,654,563 | B2 | | 5/2020 | Mellor et al. | |

(Continued)

FOREIGN PATENT DOCUMENTS

| DE | 202019104035 U1 | 10/2020 |
| EP | 0031601 A1 | 7/1981 |
| EP | 0899191 A2 | 3/1999 |

OTHER PUBLICATIONS

Peter's Engineering, "Becoming an Engineer: Boeing 767-200/-300 Main Landing Gear", Retrieved from the Internet: URL: petersengineering.blogspot.com/2014/09/boeing-767-200-300-main-landing-gear.html [retrieved on Nov. 10, 2020], Sep. 12, 2014, pp. 1-4.

(Continued)

*Primary Examiner* — Tien Q Dinh
*Assistant Examiner* — Katherine June Bolek
(74) *Attorney, Agent, or Firm* — COATS & BENNETT, PLLC (57) ABSTRACT

A support structure to mount landing gear to a wing spar of an aircraft. The support structure includes a trunnion assembly having a first trunnion and a second trunnion that are connected together with the first trunnion positioned on a first side of the wing spar and a second trunnion positioned on an opposing second side of the wing spar. The trunnion assembly is configured to support a first section of the landing gear.

20 Claims, 9 Drawing Sheets

(56) References Cited

U.S. PATENT DOCUMENTS

| | | | |
|---|---|---|---|
| 10,696,380 B2 | 6/2020 | Miller et al. | |
| 2013/0048783 A1* | 2/2013 | Ekmedzic | B64C 25/04 |
| | | | 244/102 R |
| 2014/0197277 A1* | 7/2014 | Otto | B64C 3/58 |
| | | | 244/119 |
| 2018/0037314 A1* | 2/2018 | Wilson | B64C 25/04 |
| 2018/0362150 A1* | 12/2018 | Sakota | B64C 25/12 |
| 2020/0140066 A1 | 5/2020 | Heer et al. | |
| 2020/0324882 A1 | 10/2020 | Cazin et al. | |
| 2020/0331595 A1 | 10/2020 | Block et al. | |

OTHER PUBLICATIONS

Peter's Engineering, "Becoming an Engineer: Position Fix: Rho-Rho, Rho-Theta, Theta-Theta position determination", Retrieved from the internet: URL: petersengineering.blogspot.com [retrieved on Nov. 10, 2020], Oct. 29, 2019, pp. 1-14.

EP Search Report dated Jul. 22, 2022 in re EP Application No. 22162648.4.

* cited by examiner

SUPPORT STRUCTURE FOR AN AIRCRAFT LANDING GEAR

RELATED APPLICATIONS

This application claims priority from U.S. Provisional App. No. 63/162,225, filed 17 Mar. 2021, the disclosure of which is incorporated by reference herein in its entirety.

TECHNOLOGICAL FIELD

The present disclosure relates generally to the field of landing gear for an aircraft and, more specifically, to a support structure for integrating the landing gear with the wing structure of the aircraft.

BACKGROUND

Aircraft include landing gear that is extended for takeoff and landing and retracted during flight. The landing gear absorbs landing impact energy and prevents/reduces them from reaching the airframe. The landing gear also provides braking and steering capability, assists in stopping the aircraft after touchdown, provides adequate rotation clearance during takeoff and landing, and provides a stable support for the aircraft while it is on the ground.

Some aircraft include the use of composite materials in their airframe. These materials can include carbon fiber reinforced plastic and other composites. These composite materials provide various advantages, including a reduction in weight over metallic materials, such as aluminum. The ability of the landing gear to absorb the landing forces facilitates the use of these composite materials. However, the use of composite materials for the airframe requires that the landing gear be attached in a manner to distribute the loads into the composite airframe to protect the airframe.

An issue with aircraft design is providing adequate space to stow the landing gear during flight. This is a particular issue with smaller aircraft that have space constraints in the area of the wing immediately adjacent to the fuselage on the aft half of the wing plan (commonly referred to as the Yehudi area). Current landing gear is relatively large and includes a main cylinder, wheel assembly, and dual braced gear beam configuration. This landing gear requires a relatively large amount of space to integrate with the wing structure of the aircraft and also to stow the landing gear during flight. The enlarged stowage area can cause the aircraft design to increase the Yehudi area that may result in a reduction of aircraft efficiency. There is, therefore, a desire for improved support structures and methods of mounting landing gear to a wing spar of an aircraft.

Unless explicitly identified as such, no statement herein is admitted to be prior art merely by its inclusion in the Background section.

SUMMARY

The subject matter of the present application provides examples of support structures and methods of mounting landing gear to a wing spar of an aircraft. These devices overcome the above-discussed shortcomings of existing structures and methods.

One aspect is directed to a support structure to mount landing gear to a wing spar of an aircraft. The support structure comprises a trunnion assembly comprising a first trunnion and a second trunnion that are connected together with the first trunnion positioned on a first side of the wing spar and a second trunnion positioned on an opposing second side of the wing spar. The trunnion assembly is configured to support a first section of the landing gear.

Within examples, each of the first and second trunnions comprises a respective face shaped to abut against the wing spar and respective stiffener plates on a back side of the face to stiffen and support the face.

Within examples, a fuse pin block is attached with fuse pins to the stiffener plates of the first trunnion with the fuse pin block configured to receive and support the first section of the landing gear.

Within examples, fasteners extend through the wing spar and the faces to connect together the first trunnion and the second trunnion on the opposing sides of the wing spar.

Within examples, each of the first and second trunnions comprise respective perimeter sides that extend along a perimeter of an associated face and are aligned transverse to the associated face to receive fasteners to connect the first and second trunnions to the wing spar.

Within examples, the faces of the first and second trunnions are aligned in an overlapping arrangement and are substantially parallel.

Within examples, the second trunnion is wider than the first trunnion to abut against and connect to adjacent ribs that extend transversely from the wing spar.

Within examples, a frame extends from the trunnion assembly and is configured to support a second section of the landing gear.

Within examples, the frame is mounted to the first trunnion and extends away from the wing spar to support the second section of the landing gear.

Within examples, the frame comprises an inward rib comprising a first end and a second end with the first end mounted to the first trunnion, an outward rib mounted to the wing spar away from the first trunnion with the outward rib further connected to the inward rib, and a mounting lug connected to the inward rib and the outward rib with the mounting lug comprising a mount to support the second section of the landing gear.

Within examples, the inward rib is perpendicular with the face of the first trunnion.

Within examples, a tension rod is pivotably connected to the mounting lug with the tension rod extending between the mounting lug and a center wing box of the aircraft.

One aspect is directed to a support structure to mount a landing gear to a wing spar of an aircraft. The support structure comprises a first trunnion mounted to a rear side of the wing spar with the first trunnion configured to connect to a forward section of the landing gear. A second trunnion is mounted on an opposing front side of the wing spar and connected to the first trunnion. The first trunnion and the second trunnion are in an overlapping arrangement on the opposing sides of the wing spar.

Within examples, a frame is mounted to the first trunnion and extends outward from the first trunnion in a rear direction away from the wing spar with the frame configured to connect to a rear section of the landing gear.

Within examples, a first mount is connected to the first trunnion and configured to connect to the forward section of the landing gear, and a second mount is connected to the frame and configured to connect to the rear section of the landing gear.

Within examples, fasteners extend through the wing spar and connect the first trunnion and the second trunnion together on the opposing sides of the wing spar.

Within examples, the frame comprises an outward rib with a first end and a second end with the first end mounted to the wing spar and the second end extends outward behind the wing spar, an inward rib with a first end connected to the first trunnion and an opposing second end mounted to the wing spar, and a mounting arm connected to the outward rib and configured to connect to the rear section of the landing gear.

One aspect is directed to a method of mounting a landing gear to a wing spar of an aircraft. The method comprises: positioning a first trunnion on a first side of the wing spar; positioning a second trunnion on an opposing second side of the wing spar; and connecting together the first and second trunnions with the wing spar positioned therebetween.

Within examples, the method further comprises positioning a frame that is connected to the first trunnion outward in a rear direction away from the wing spar and connecting the landing gear to the first trunnion and the frame.

Within examples, the method further comprises extending fasteners through the wing spar and the first and second trunnions and connecting together the first and second trunnions.

Within examples, the method further comprises connecting each of the first and second trunnions to an upper wing panel and to a lower wing panel.

The features, functions and advantages that have been discussed can be achieved independently in various aspects or may be combined in yet other aspects, further details of which can be seen with reference to the following description and the drawings.

DETAILED DESCRIPTION

Figure 1:
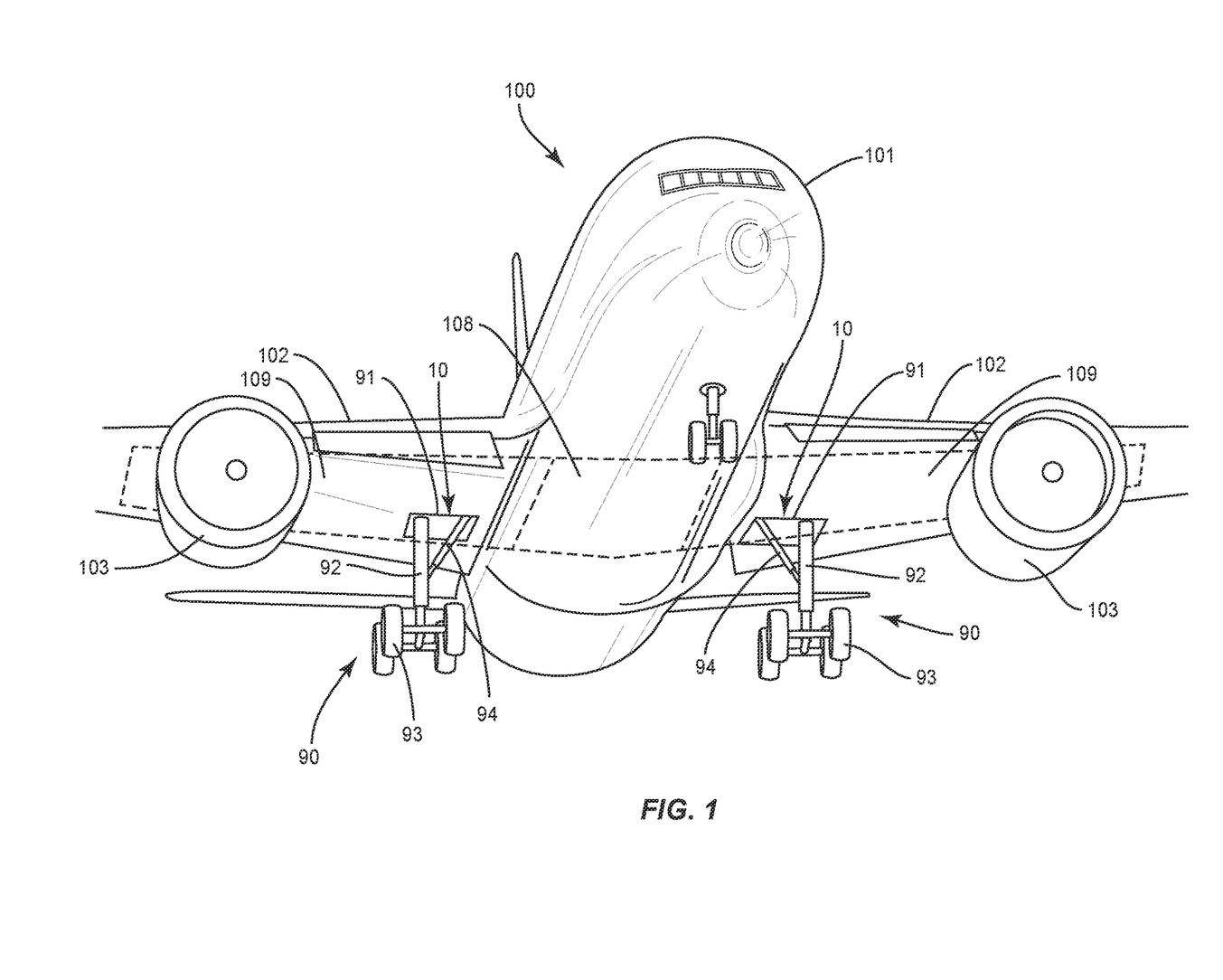
FIG. 1 is a perspective view of an aircraft with the landing gear in an extended configuration, according to an example embodiment.

FIG. 1 illustrates one example of an aircraft 100 that includes a fuselage 101 and wings 102. Engines 103 are mounted to the wings 102 for propelling the aircraft 100. Structurally, the aircraft 100 includes a center wing box 108 positioned in the fuselage 101 that is connected to and supports wing boxes 109 that form the structural framework of the wings 102. The center wing box 108 is positioned between and connected to the wing boxes 109. The center wing box 108 experiences stresses such as tension, compression, shear and torsion due to aerodynamic forces from the wings 102 while in flight, and due to the weight of the wings 102 themselves and from the fuel contained within the wings 102 when the aircraft 100 is on the ground. In addition, the center wing box 108 transmits forces from the wings 102 to the fuselage 101.

Landing gear 90 is mounted to the underside of the aircraft 100. The landing gear 90 is configured to transition between a deployed configuration (as illustrated in FIG. 1) when the aircraft 100 is landing or taxiing about the runway, and a retracted configuration positioned in a compartment 91 within the aircraft 100. In one example as illustrated in FIG. 1, the compartment 91 is positioned within the wings 102 and fuselage 101.

The landing gear 90 includes a cylinder 92 that extends downward from the underside of the aircraft 100 when the landing gear 90 is deployed. The cylinder 92 includes a shock strut (sometimes referred to as a main support or main member) that carries a wheel assembly 93. A single brace 94 is pivotably coupled to the cylinder 92. The landing gear 90 can also include various other components, including but not limited to spring assemblies and actuators configured to transition the landing gear 90 between the retracted and deployed configurations.

Figure 2:
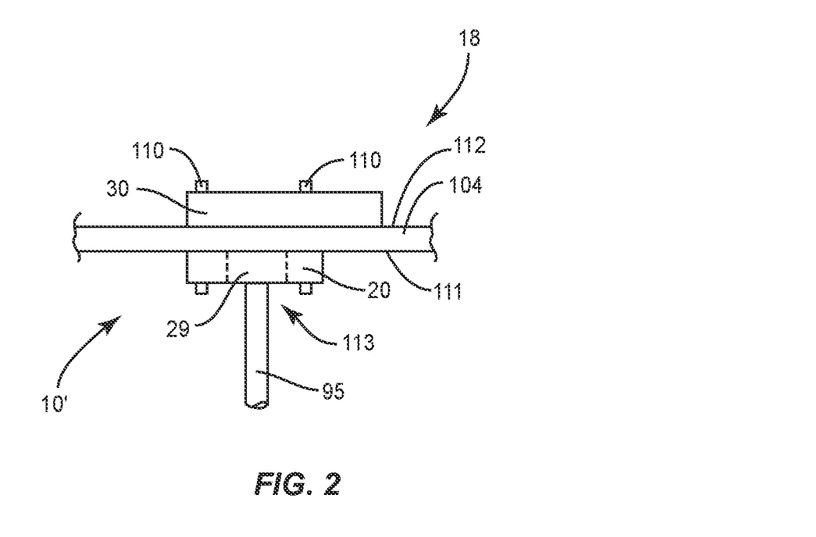
FIG. 2 is a schematic diagram of a support structure including a first trunnion and a second trunnion attached to a wing spar of an aircraft and supporting a section of a landing gear beam, according to an example embodiment.
Figure 3:
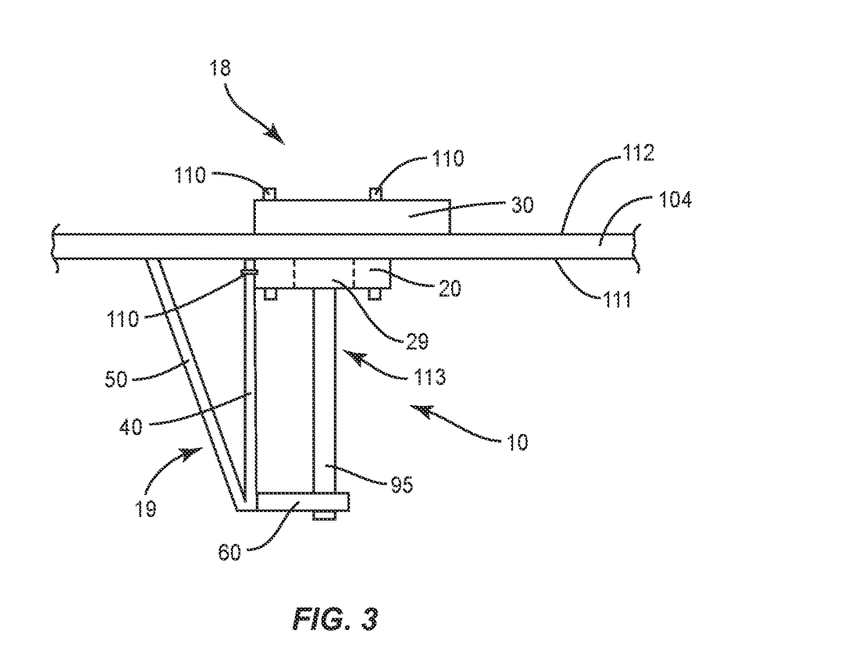
FIG. 3 is a schematic diagram of a support structure including a first trunnion and a second trunnion attached to a wing spar of an aircraft and a frame attached to and extending outward from the first trunnion with a landing gear beam being supported, according to an example embodiment.

The landing gear 90 is mounted to the wing box 109 of the wing 102 in a manner to be movable between the retracted and deployed configurations. An example support structure for mounting and integrating the landing gear 90 to the wing box 109 is illustrated schematically in FIG. 2. As shown in FIG. 2, the support structure 10' for mounting and integrating the landing gear 90 to the wing box 109 includes a trunnion assembly 18. The trunnion assembly 18 includes first and second trunnions 20, 30. The first trunnion 20 is mounted to a first side 111 of a wing spar 104 that forms part of the wing box 109. The second trunnion 30 is mounted to a second side 112 of the wing spar 104 opposite from the first trunnion 20. The first and second trunnions 20, 30 are connected together with fasteners 110 that extend through the wing spar 104. A fuse pin block 29 is connected to the first trunnion 20 and is configured to receive a forward end of the pin 95 of the landing gear 90. The trunnion assembly 18 provides for attaching and integrating a first section 113 the landing gear 90 to the wing box 109. In one example as illustrated in FIGS. 2 and 3, the first section 113 includes a leading end of the pin 95. Other examples can include various components of a forward section of the landing gear 90 connected to the first trunnion 20. A rear section of the landing pin 95 can be supported in various manners as described below.

FIG. 3 illustrates another example support structure for mounting and integrating the landing gear 90 to the wing box 109. As illustrated in FIG. 3, the support structure 10 includes a frame 19 attached to the trunnion assembly 18. The frame 19 has an elongated shape that is attached to the trunnion assembly 18 and extends outward to support a second end of the pin 95 of the landing gear 90. The frame 19 is attached to the trunnion assembly 18 with fasteners 110 to transfer forces applied to the frame 19 to the trunnion assembly 18 and wing spar 104.

The support structures include a cantilever design that is supported by and extends outward from the rear side 111 of the wing spar 104. This structure eliminates a main gear beam in previous structures that supports the opposing side of the landing gear.

As illustrated in FIGS. 2 and 3, the first and second trunnions 20, 30 are in an overlapping arrangement on the opposing sides of the wing spar 104. The overlapping arrangement provides for one or more fasteners 110 to extend through both of the first and second trunnions 20, 30 as well as the intermediate wing spar 104. In one example, the faces 21, 31 of the first and second trunnions 20, 30 are parallel. In another example, the faces 21, 31 are non-parallel.

In one example illustrated in FIG. 3, the frame 19 includes a rib 40 that is attached with one or more fasteners 110 to the first trunnion 20. A second rib 50 (also referred to herein as an outward rib) is positioned outward from the rib 40 is connected to the wing spar 104. The frame 19 also includes lug 60 that is supported by one or both of the ribs 40, 50 and that connects to a rear of the pin 95.

Figure 4:
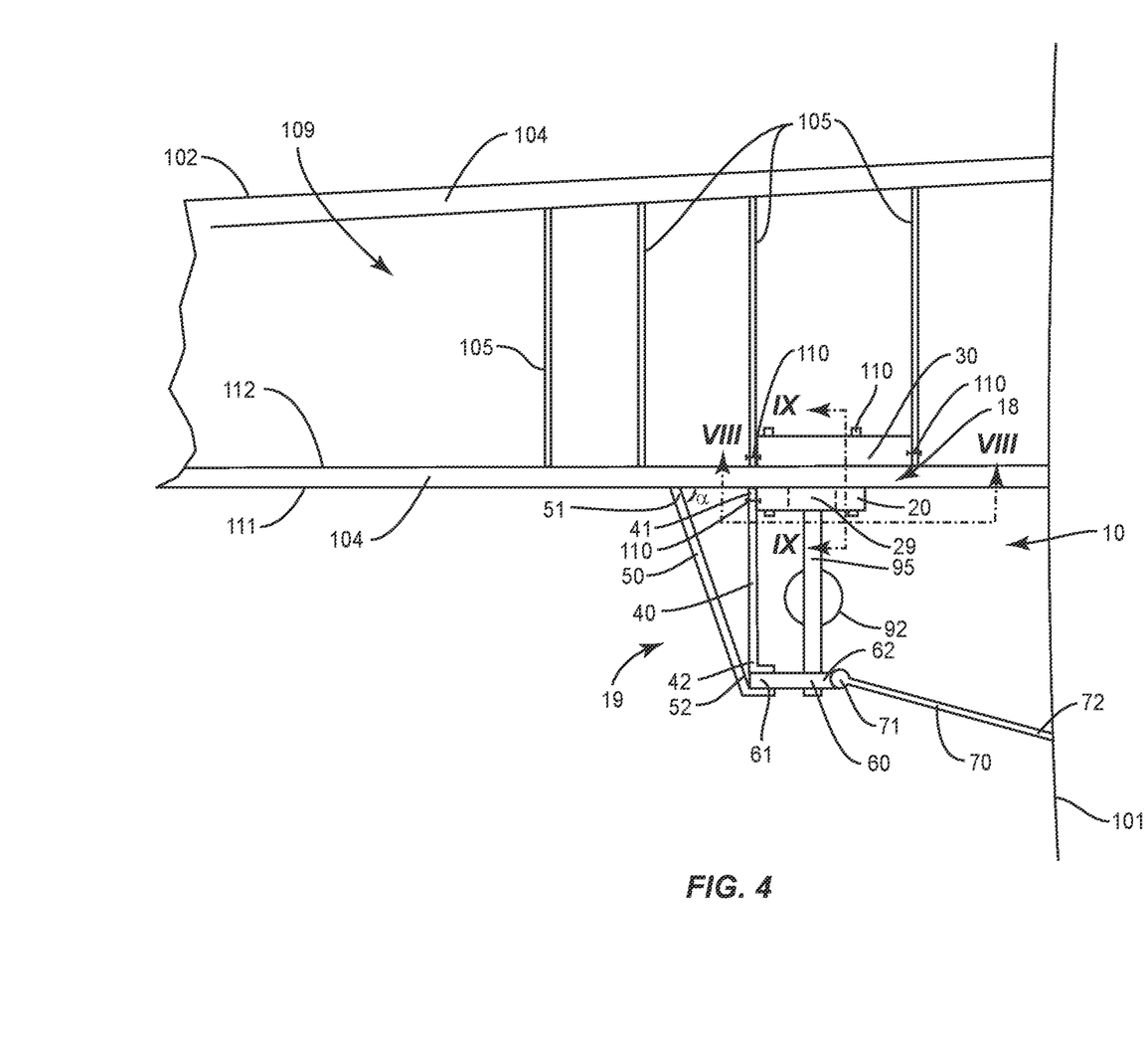
FIG. 4 is a schematic diagram of a support structure for supporting the landing gear to a wing structure of an aircraft, according to an example embodiment.
Figure 5:
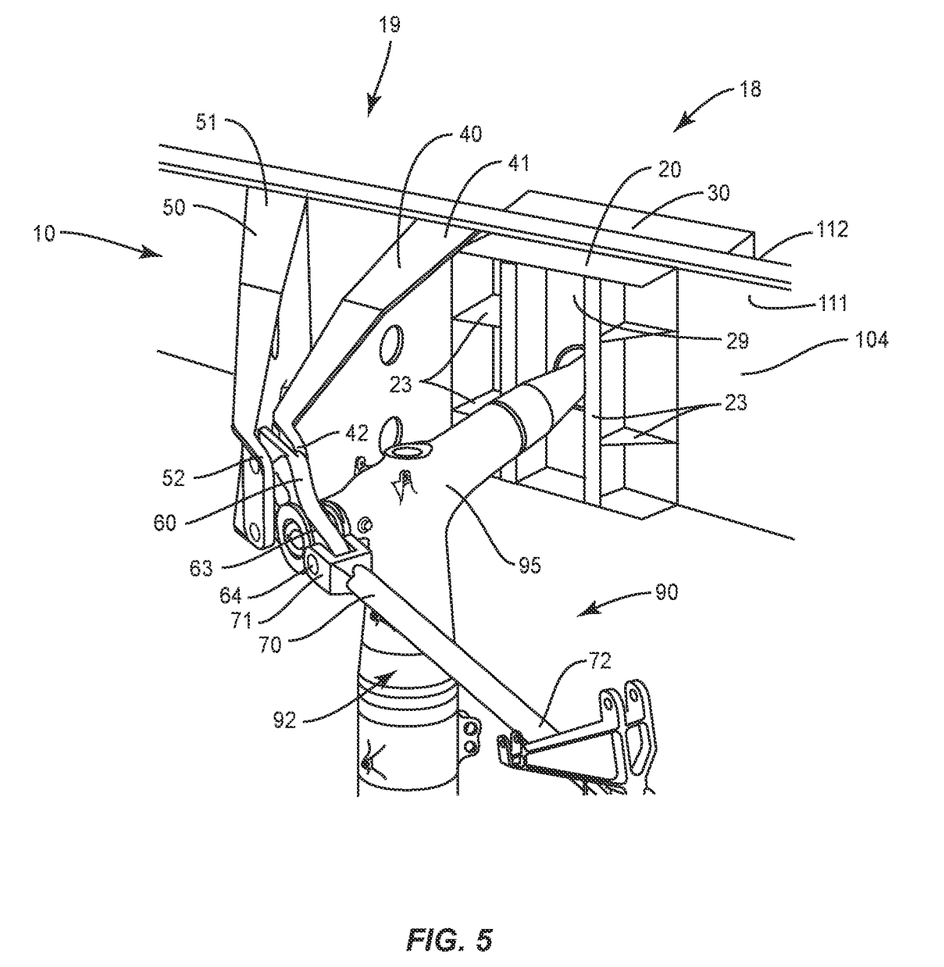
FIG. 5 is a perspective view of a support structure for supporting the landing gear to a wing of an aircraft, according to an example embodiment.

FIGS. 4 and 5 illustrates an example that includes a support structure 10 having both the trunnion assembly 18 and the frame 19 supporting the landing gear 90. As illustrated in FIG. 4, the wing box 109 includes front and rear wing spars 104 that extend along the length of the wing 102. Ribs 105 extend across the width of the wings 102 transverse to the wing spars 104. The number and positioning of the wing spars 104 and ribs 105 can be vary depending upon the design of the wing box 109. The wings 102 also include an upper wing panel 106 and lower wing panel 107 (see FIG. 8) that extend over the spars 104 and ribs 105 as will be explained in more detail later.

In one example, one or more of the wing spars 104, ribs 105, and panels 106, 107 are constructed from fiber-reinforced resin materials referred to as composite materials. Composite materials have relatively high strength-to-weight ratios, good corrosion resistance, and other beneficial properties that make them particularly well suited for use in aerospace applications. Conventional composite materials typically include glass, carbon, or polyaramid fibers in woven and non-woven configurations. In the raw material stage, the fibers can be formed into tapes, filaments, and fabric sheets that are pre-impregnated with uncured resin. The raw materials can be manufactured into parts by laminating them onto a mold surface, and then applying heat and pressure to cure the resin and harden the laminate. Composite sandwich structures can be manufactured by laminating a core material (e.g., a foam or honeycomb material) between two face sheets composed of laminated plies, tapes, and/or filaments. Face sheets can also include one or more metallic layers. In one example, at least the rear wing spar 104 is constructed from composite materials. In another example, at least the wing spars 104 and ribs 105 are constructed from composite materials. In another example, the entire wing box 109 is constructed from composite materials. In other examples, one or more of the wing components, including the wing spars 104, ribs 105, and upper and lower wing panels 106, 107 are constructed from metals, such as aluminum.

The example of FIGS. 4 and 5 include a support structure 10 for supporting and integrating the landing gear 90 that includes both a trunnion assembly 18 and a frame 19. The trunnion assembly 18 is mounted to the rear wing spar 104. The frame 19 is mounted to the trunnion assembly 18 and extends rearward away from the rear wing spar 104. The pin 95 of the landing gear 90 is mounted to the trunnion assembly 18 and frame 19. The pin 95 is rotatably mounted to pivot when the landing gear 90 moves between the retracted and extended orientations.

The trunnion assembly 18 includes the first trunnion 20 and the second trunnion 30. The first trunnion 20 is mounted to the first side 111 of the rear wing spar 104. The second trunnion 30 is mounted to the second side 112 of the rear wing spar 104 opposite from the first trunnion 20. The first and second trunnions 20, 30 are connected together with the rear wing spar 104 positioned between and spacing apart the first and second trunnions 20, 30. Each of the first and second trunnions 20, 30 is sized to extend along a section of the wing spar 104 and fit between adjacent ones of the ribs 105. In one example as illustrated in FIG. 4, the second trunnion 30 is wider than the first trunnion 20. The second trunnion 30 is attached with fasteners 110 to each of the adjacent ribs 105.

Figure 6A:
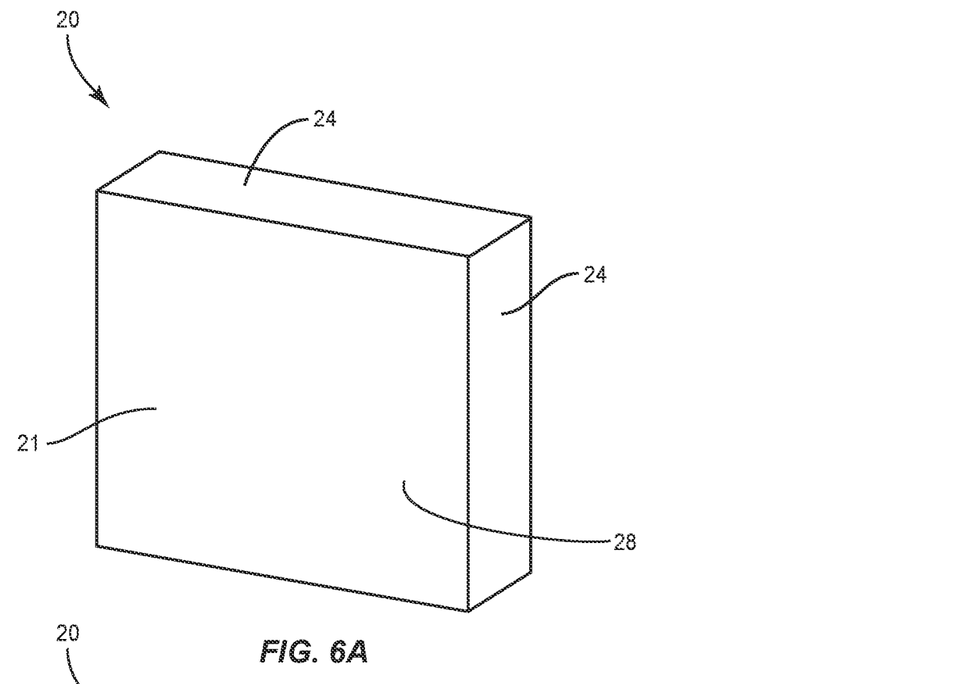
FIG. 6A is a front perspective view of a first trunnion, according to an example embodiment.
Figure 6B:
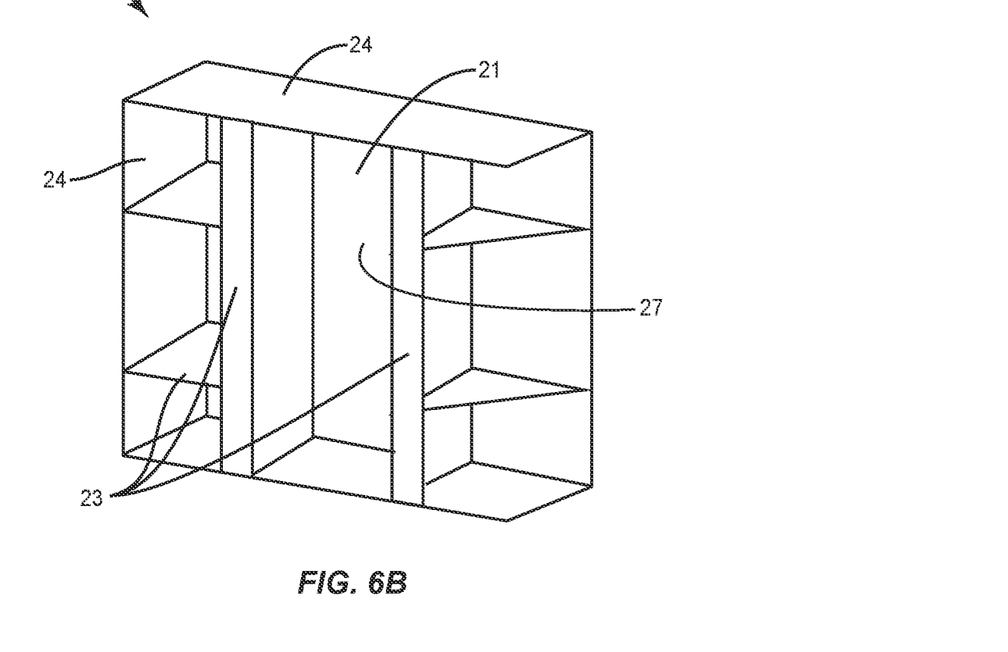
FIG. 6B is a rear perspective view of the first trunnion of FIG. 6A, according to an example embodiment.
Figure 7A:
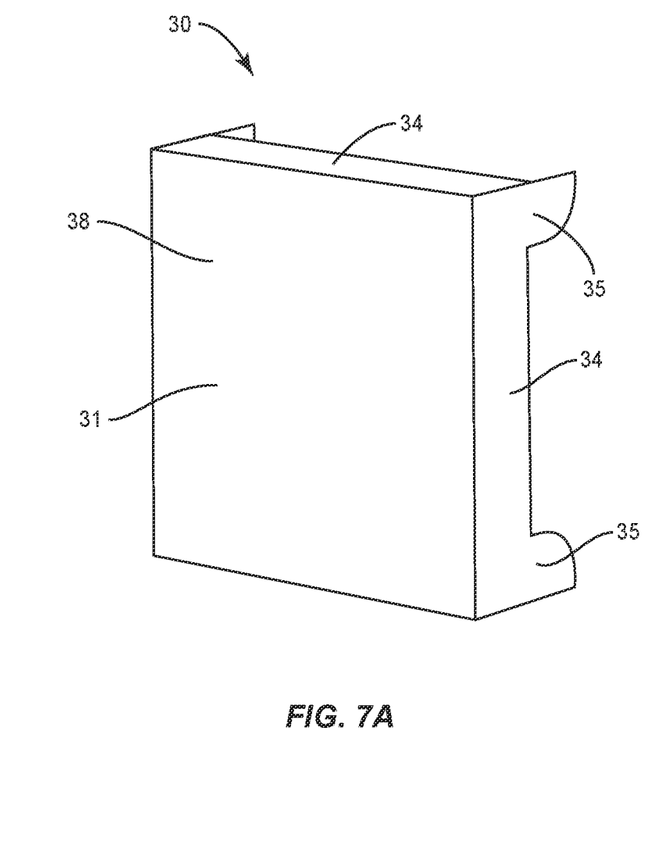
FIG. 7A is a front perspective view of a second trunnion, according to an example embodiment.
Figure 7B:
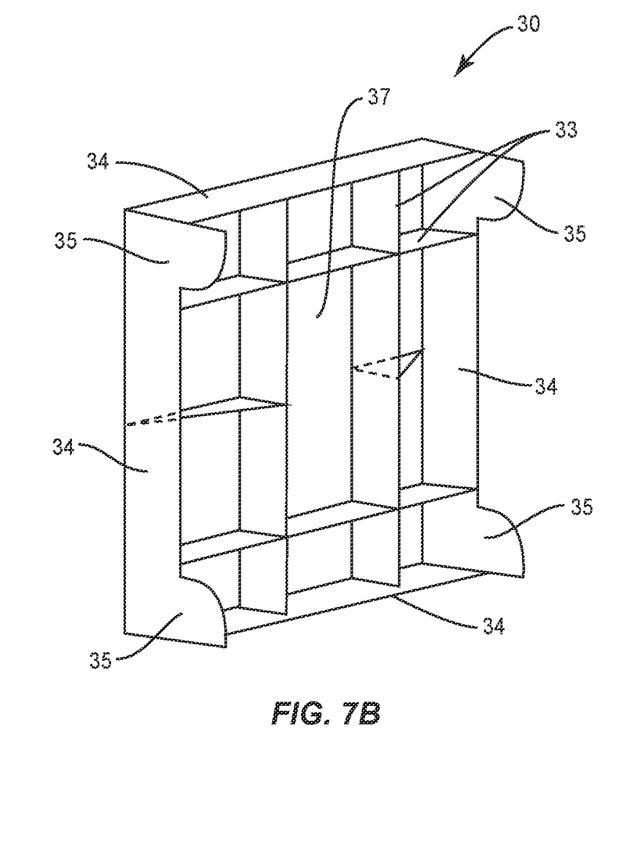
FIG. 7B is a rear perspective view of the second trunnion of FIG. 7A, according to an example embodiment.

FIGS. 6A and 6B illustrate the first trunnion 20 and FIGS. 7A and 7B illustrate the second trunnion 30. Each of the first and second trunnions 20, 30 respectively include a face 21, 31 with a front side 28, 38 shaped to abut against the wing spar 104 and an opposing rear side 27, 37. In one example, the faces 21, 31 are substantially flat. Other examples include various curvatures, indentations, extensions, etc. to conform to the wing spar 104. Perimeter sides 24, 34 are positioned along the perimeter and extend outward away from the rear sides 27, 37. The perimeter sides 24, 34 provide structure to connect with other components of the wing box 109 as will be explained below. In one example as illustrated in FIG. 6B, the first trunnion 20 includes three perimeter sides 24 that extend around three of the four outer sides. The perimeter wall does not extend around the fourth side because this side is spaced away from the wing structures and is not positioned to be connected with a fastener to the wing structures. In one example as illustrated in FIGS. 7A and 7B, a pair of opposing perimeter sides 34 of the second trunnion 30 include wings 35 that are wider than an intermediate section. Stiffener plates 23, 33 are positioned along the rear sides 27, 37 of the face 21, 31 and perimeter sides 24, 34 to strengthen and stiffen the respective first and second trunnions 20, 30. The stiffener plates 23 can extend in a horizontal and/or vertical orientation.

In one example, the first and second trunnions 20, 30 are constructed from composite materials. In another example, the first and second trunnions 20, 30 are constructed from metal, such as aluminum. The first and second trunnions 20, 30 can be constructed from the same or different materials.

Figure 8:
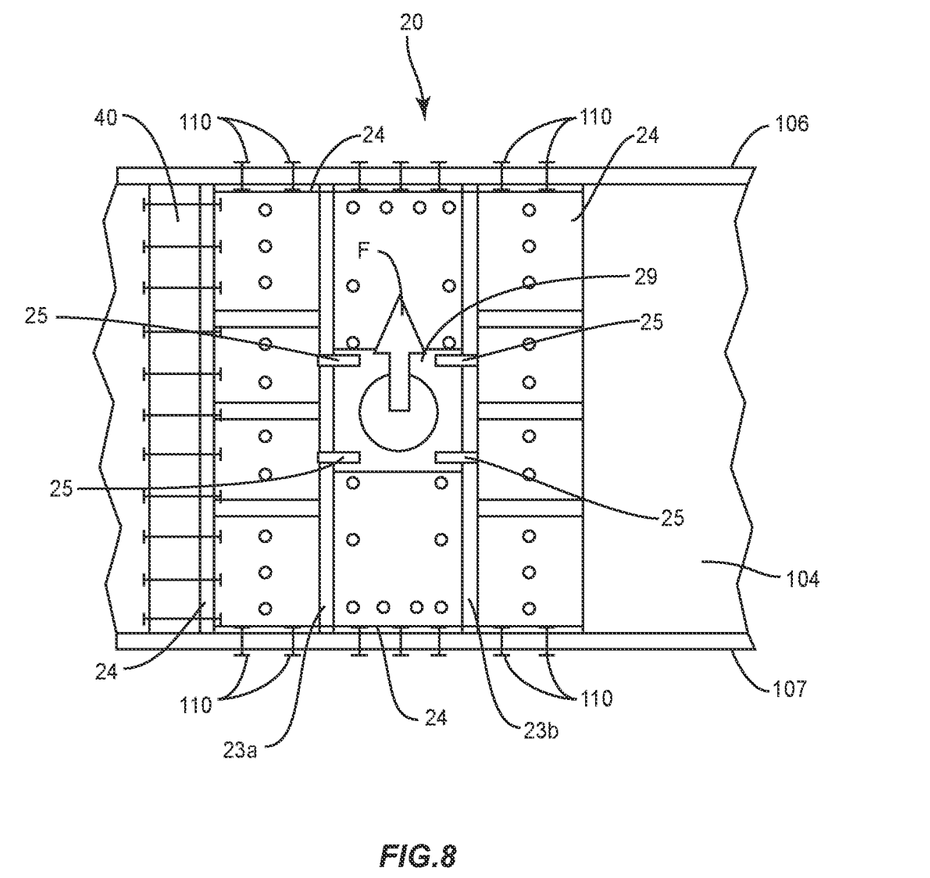
FIG. 8 is a schematic section view cut along line VIII-VIII of FIG. 4, according to an example embodiment.

FIG. 8 illustrates additional detail of the first trunnion 20 mounted to the rear wing spar 104. The first trunnion 20 is sized to fit between the upper and lower wing panels 106, 107. The three perimeter sides 24 abut against and/or are positioned in proximity to the upper and lower wing panels 106, 107 and the first trunnion 20. Fasteners 110 connect the perimeter sides 24 to the upper and lower wing panels 106, 107 and first trunnion 20.

The fuse pin block 29 that receives the pin 95 of the landing gear 90 is secured to the first trunnion 20. The fuse pin block 29 is sized to fit between a pair of vertical stiffener plates 23a, 23b. Fuse pins 25 attach the fuse pin block 29 to the stiffener plates 23a, 23b. The fuse pins 25 are configured to maintain the fuse pin block 29 attached to the first trunnion 20 during normal landing events when the forces applied by the landing gear 90 are below a predetermined amount. In the event of an excessive force F above the predetermined amount that is applied to the fuse pin block 29 through the landing gear 90, the fuse pins 25 are configured to shear. In one example, this includes one or more of the fuse pins 25 shearing into multiple pieces. The shearing releases the fuse pin block 29 and allows for its movement relative to the first trunnion 20 with the first trunnion 20 remaining attached to the wing spar 104. This movement prevents an excessive amount of force to be applied to the wing box 109 by the landing gear 90.

Figure 9:
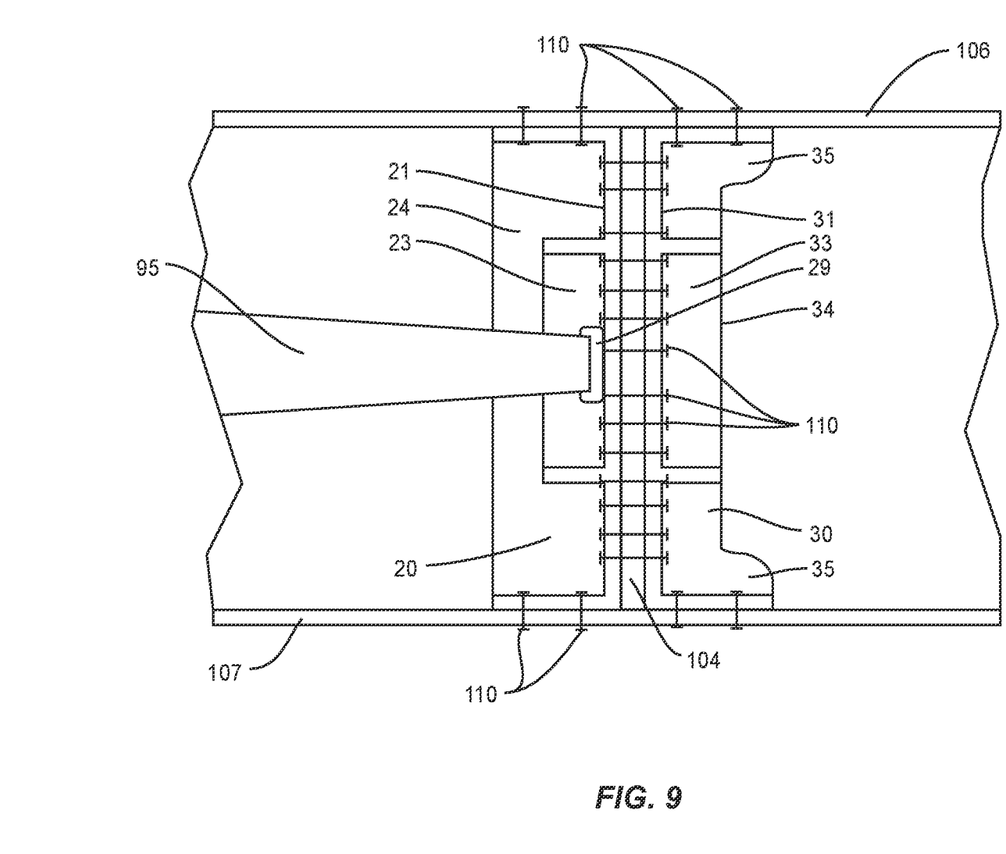
FIG. 9 is a schematic section view cut along line IX-IX of FIG. 4, according to an example embodiment.

FIG. 9 illustrates the first and second trunnions 20, 30 mounted to the wing spar 104. The first trunnion 20 is positioned on a first side (i.e., aft side) of the wing spar 104. The first trunnion 20 is sized to fit between the upper and lower wing panels 106, 107 with the face 21 abutting against the rear side of the wing spar 104. The perimeter sides 24 are positioned against the upper and lower wing panels 106, 107 and connected with fasteners 110.

The second trunnion 30 is positioned on a second side (i.e., fore side) of the wing spar 104. The second trunnion 30 is sized to fit between the upper and lower wing panels 106, 107 with the face 31 abutting against the wing spar 104. The perimeter sides 34 are positioned against the upper and lower wing panels 106, 107 and connected with fasteners 110. The perimeter sides 34 of the second trunnion 30 are further connected with fasteners 110 to the ribs 105 of the wing 102. The faces 21, 31 are positioned on opposing sides of the wing spar 104 with the faces 21, 31 being spaced apart from one another. In one example, the faces 21, 31 are parallel to one another. Fasteners 110 extend through the wing spar 104 and the faces 21, 31 to connect together the first and second trunnions 20, 30.

The frame 19 supports the opposing side of the pin 95 of the landing gear 90 (i.e., the rear section of the pin 95). FIGS. 4 and 5 illustrate one example of the frame 19 that includes an inward rib 40, and outward rib 50, and a mounting lug 60. The frame 19 provides for the loads exerted on the landing gear to be transferred to the wing 102.

The inward rib 40 is mounted to the first trunnion 20 and extends outward away from the wing spar 104. The inward rib 40 includes an elongated shape with a first end 41 mounted to the first trunnion 20 and a second end 42 mounted to the outward rib 50 and/or mounting lug 60. As illustrated in FIG. 8, the inward rib 40 is sized to fit between the upper and lower wing panels 106, 107 and abut against the outer side of the first trunnion 20. The inward rib 40 abuts against the outer side of the perimeter side 24 of the first trunnion 20. Fasteners 110 extend through the inward rib 40 and perimeter side 24 to connect the inward rib 40 to the first trunnion 20. The connection of the inward rib 40 to the first trunnion 20 provides for the load applied by the landing gear 90 to be transferred to the first trunnion 20. The inward rib 40 can be spaced apart from or in contact against one or more of the upper and lower wing panels 106, 107 and the wing spar 104.

The outward rib 50 is mounted to the wing spar 104 at a point spaced away from the inward rib 40 (i.e., on an outboard side that is farther away from the fuselage 101). The outward rib 50 includes an elongated shape with a first end 51 mounted to the wing spar 104 and the second end 52 connected to one or both of the inward rib 40 and the mounting lug 60. The first end 51 is connected with fasteners 110 to one or more of the wing spar 104, ribs 105, and upper and lower panels 106, 107 of the wing box 109. In one example as illustrated in FIG. 4, the first end 51 connects the wing 102 at one of the ribs 105.

The outward rib 50 has a greater length (measured between the ends 51, 52) than the inward rib 40 (measured between ends 41, 42). The outward rib 50 is aligned at an angle α relative to the wing spar 104. In one example, the angle α is between about 10°-45°. The inward rib 40 is aligned at an angle relative to the wing spar 104 of between about 85°-95°. In one example, the inward rib 40 is aligned at angle of 90°. In one example, the inward rib 40 is aligned perpendicular to the face 21 of the first trunnion 20.

In one example, the second end 42 of the inward rib 40 connects to the outward rib 50 at the second end 52. In another example, the second end 42 connects to the outward rib 50 inward from and away from the second end 52. In another example as illustrated in FIG. 5, each of the inward and outward ribs 40, 50 connect to the mounting lug 60.

The mounting lug 60 includes a mount 63 to connect with the rear end of the pin 95 of the landing gear 90. The mount 63 is positioned between a first end 61 of the mounting lug 60 that is connected to one or both of the ribs 40, rib 50, and an opposing second end 62. The mount 63 is configured to support the pin 95 and provide for rotation between the extended and retracted orientations.

A tension rod 70 is attached to the mounting lug 60. The tension rod 70 includes a first end 71 mounted to the mounting lug 60 and a second end 72 mounted to the fuselage 101. The tension rod 70 is pivotably connected to the lug 60 with the tension rod 70 extending between the lug 60 and a center wing box 108 of the aircraft 100. As illustrated in FIG. 5, the first end 71 forms a hinge 64 to pivotably connect to the lug 60. In one example, the first end 71 includes a clevis that is connected to the mounting lug 60 to form the hinge 64. The tension rod 70 applies a force on the mounting lug 60 in a plane that extends along the length of the wing 102. The tension rod 70 is configured to provide for movement of the mounting lug 60 and landing gear within a fore-aft plane and in a vertical plane.

Fasteners 110 connect together various components of the support structure 10 and/or mount the support structure to the aircraft 100. The fasteners 110 can include a variety of different mechanical structures, including but not limited to rivets, screws, and bolts.

Figure 10:
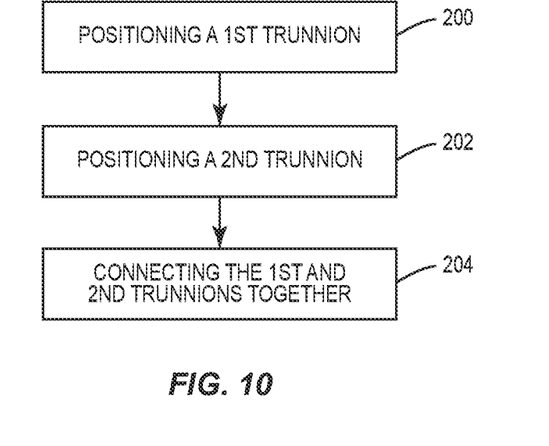
FIG. 10 is a flowchart diagram of a method of mounting a landing gear to a wing spar of an aircraft, according to an example embodiment.

FIG. 10 illustrates one method of mounting a landing gear 90 to a wing spar 104 of an aircraft 100. The method includes positioning a first trunnion 20 on a first side of the wing spar 104 (block 200) and positioning a second trunnion 30 on an opposing second side of the wing spar 104 (block 202). The method includes connecting together the first and second trunnions 20, 30 with the wing spar 104 positioned therebetween (block 204). The first and second trunnions 20, 30 provide for integrating the landing gear 90 and to distribute the forces applied to the landing gear 90 to the wing box 109.

Figure 11:
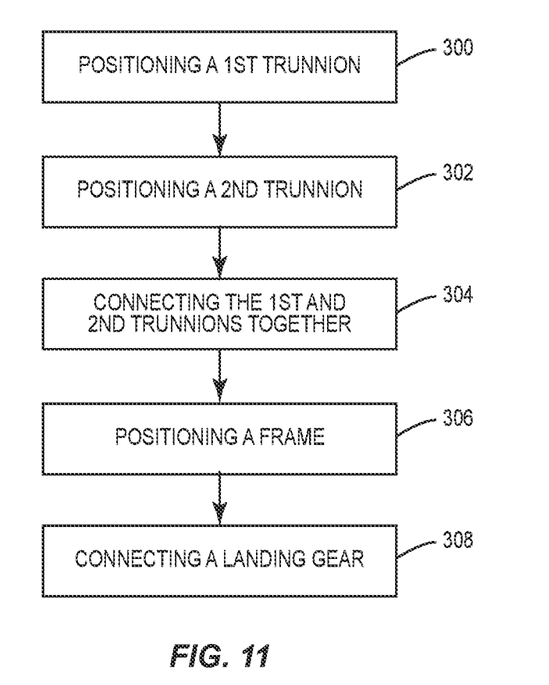
FIG. 11 is a flowchart diagram of a method of mounting a landing gear to a wing spar of an aircraft, according to an example embodiment.

FIG. 11 illustrates another method of mounting a landing gear 90 to a wing spar 104 of an aircraft 100. The method includes positioning a first trunnion 20 on a first side of the wing spar 104 (block 300) and positioning a second trunnion 30 on an opposing second side of the wing spar 104 (block 302). The first and second trunnions 20, 30 are connected together with the wing spar 104 positioned between (block 304). The method further includes positioning a frame 19 that is connected to the first trunnion 20 outward in a rear direction away from the wing spar 104 (block 306). The method also includes connecting the landing gear 90 to the first trunnion 20 and the frame 19 (block 308).

The disclosed support structure provides numerous advantages over existing designs. The support structure enables a single braced cantilever main landing gear configuration to integrate with the aircraft 100. The single braced cantilever main landing gear results in reduced Yehudi which results in increased aircraft performance. The cantilever landing gear design provides for making other architectural modifications to the aircraft 100 that can provide for other efficiency increases. The support structure further eliminates the forward drag brace and gear beam from existing support designs. The support structure also reduces peak loads in the body joint area and provides for a more basic wing to body joint.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present embodiments may be carried out in other ways than those specifically set forth herein without departing from essential characteristics of the support structure concept. The present embodiments are to be considered in all respects as illustrative and not restrictive, and all changes coming within the meaning and equivalency range of the appended claims are intended to be embraced therein.

What is claimed is:

1. A support structure to mount a landing gear to a wing spar of an aircraft, the support structure comprising:
    a trunnion support assembly comprising a first trunnion support and a second trunnion support that are connected together with the first trunnion support positioned on a first side of the wing spar and a second trunnion support positioned on an opposing second side of the wing spar, each of the first trunnion support and the second trunnion support comprising stiffener plates that form perimeter sides that extend around a central area and a face plate connected to the stiffener plates to fully enclose one side of the central area, the trunnion support assembly configured to support a first section of the landing gear.

2. The support structure of claim 1, wherein each of the face plates comprises a front side shaped to abut against the wing spar and a rear side connected to the stiffener plates.

3. The support structure of claim 2, further comprising a fuse pin block attached with fuse pins to the stiffener plates within the central area of the first trunnion support, the fuse pin block configured to receive and support the first section of the landing gear.

4. The support structure of claim 2, further comprising fasteners sized to extend through the wing spar and the faces to connect together the first trunnion support and the second trunnion support on the opposing first and second sides of the wing spar.

5. The support structure of claim 2, wherein the respective perimeter sides of the first and second trunnion supports extend along a perimeter of the associated face and are aligned transverse to the associated face.

6. The support structure of claim 5, wherein the second trunnion support is wider than the first trunnion support to abut against and connect to adjacent ribs that extend transversely from the wing spar.

7. The support structure of claim 2, wherein the faces of the first and second trunnion supports are aligned in an overlapping arrangement and are substantially parallel.

8. The support structure of claim 1, further comprising a frame that extends from the trunnion support assembly and is configured to support a second section of the landing gear.

9. The support structure of claim 8, wherein the frame is mounted to the first trunnion support and extends away from the wing spar to support the second section of the landing gear.

10. The support structure of claim 9, wherein the frame comprises:
    an inward rib comprising a first end and a second end, wherein the first end is mounted to the first trunnion support;
    an outward rib that is mounted to the wing spar away from the first trunnion support, the outward rib further connected to the inward rib; and
    a lug connected to the inward rib and the outward rib, the lug comprising a mount to support the second section of the landing gear.

11. The support structure of claim 10, wherein the inward rib is perpendicular with a face of the first trunnion support.

12. The support structure of claim 10, further comprising a tension rod pivotably connected to the lug, the tension rod extending between the mounting lug and a center wing box of the aircraft.

13. A support structure to mount a landing gear to a wing spar of an aircraft, the support structure comprising:
    a first trunnion support mounted to a rear side of the wing spar, the first trunnion support configured to connect to a forward section of the landing gear; and
    a second trunnion support mounted on an opposing front side of the wing spar and connected to the first trunnion support;
    a frame mounted to the first trunnion support and extending outward from the first trunnion support in a rear direction away from the wing spar and configured to connect to a rear section of the landing gear, the frame comprising a rib with a first end connected to the first trunnion support and a second end positioned outward away from the wing spar to support the rear section of the landing gear;
    wherein the first trunnion support and the second trunnion support are aligned in an overlapping arrangement on the opposing front and rear sides of the wing spar;
    wherein the second trunnion support is connected to the frame just through the connection with the first trunnion support.

14. The support structure of claim 13, wherein the first trunnion support comprises a face with a first side configured to contact against the rear side of the wing spar and stiffener plates connected to a second side of the face and wherein the rib of the frame is connected to one of the stiffener plates.

15. The support structure of claim 14, wherein the rib is a first rib and further comprising
    a second rib positioned outward from the first rib and comprising a first end configured to connect to the wing spar and a second end configured to connect to the rear section of the landing gear.

16. The support structure of claim 13, further comprising fasteners that extend through the wing spar and connect the first trunnion support and the second trunnion support together on the opposing front and rear sides of the wing spar.

17. The support structure of claim 14, wherein the rib is an inward rib and the frame further comprises:

an outward rib with a first end and a second end, the first end mounted to the wing spar and the second end extending outward behind the wing spar;

a lug connected to at least one of the outward rib and the inward rib and configured to connect to the rear section of the landing gear.

18. A method of mounting a landing gear to a wing spar of an aircraft, the method comprising:

positioning a first trunnion support on a first side of the wing spar;

positioning a second trunnion support on an opposing second side of the wing spar;

connecting together the first and second trunnion supports with the wing spar positioned therebetween; and positioning a face plate of the first trunnion support between the wing spar and a pin of the landing gear.

19. The method of claim 18, further comprising:

positioning a frame that is connected to the first trunnion support outward in a rear direction away from the wing spar; and connecting the landing gear to the first trunnion support and the frame.

20. The method of claim 19, further comprising extending fasteners through the wing spar and the first and second trunnion supports and connecting together the first and second trunnion supports.

* * * * *